F. WOLFERSBERGER.
Bee Hive.
No. 2,617.
Patented May 12, 1842.
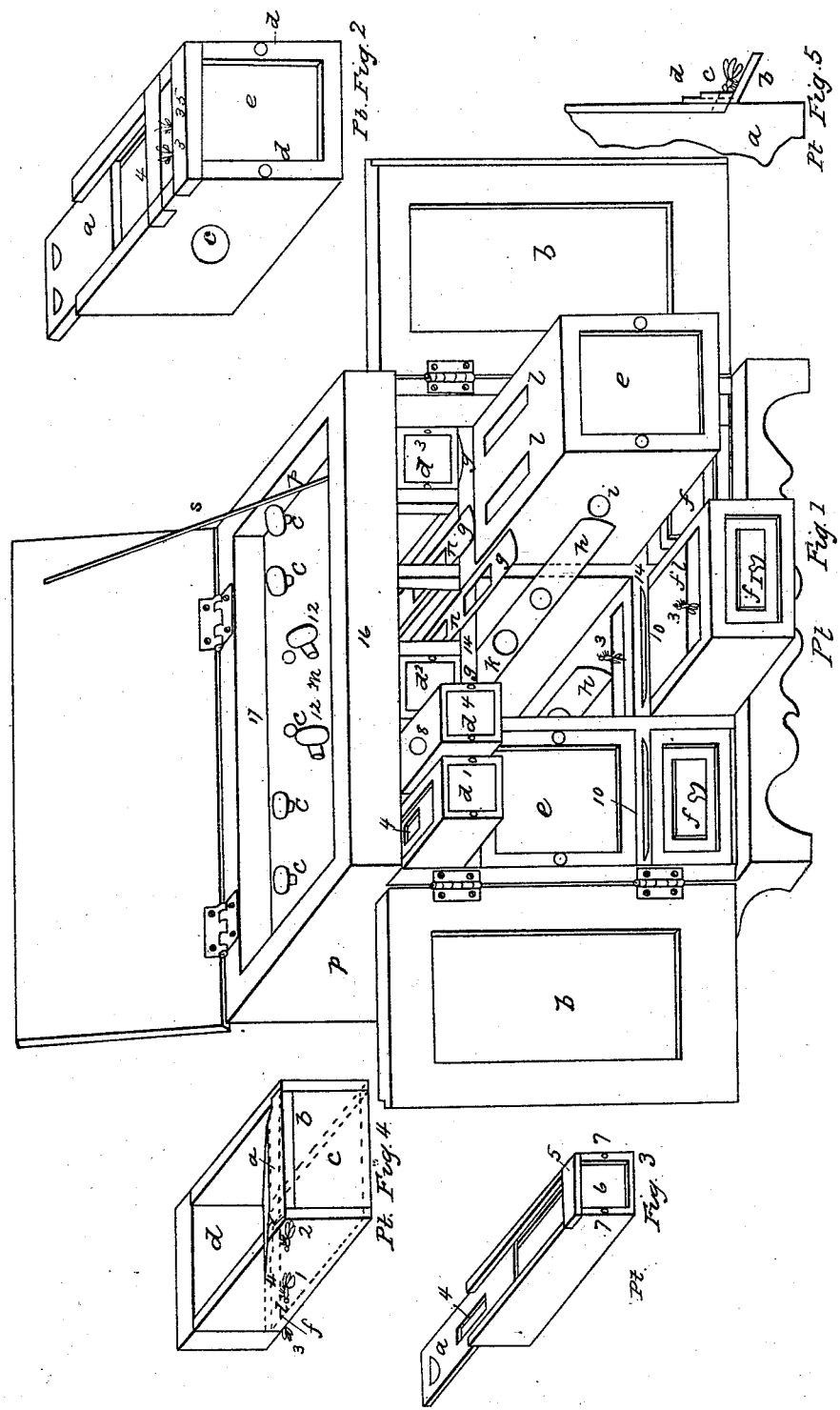

UNITED STATES PATENT OFFICE.

FREDERICK WOLFERSBERGER, OF PLYMOUTH, OHIO.

BEEHIVE.

Specification of Letters Patent No. 2,617, dated May 12, 1842.

*To all whom it may concern:*

Be it known that I, FREDERICK WOLFERSBERGER, of the town of Plymouth, in the county of Richland and State of Ohio, have invented a new and Improved Plan for a Bee-House; and I do hereby declare that the following is a full and exact description of the same, the accompanying drawing being a part of this specification.

To enable others skilled in the art to make and use my invention I will proceed to describe its construction and operation for a house large enough for the swarms of bees of which—

Figure 1 is a perspective drawing 3 ft. 6 inches high, 3 ft. 10 in. wide and one foot 3 deep from front of doors to back of chest, the end pieces, pl. Fig. 1, being made of one piece of board 3 ft. 6 in. long, one ft. 2 in. wide. The bottom and top pieces are the same width of the ends, and let into the wall by a groove. The two other shelves marked 14, 14, pl. Fig. 1, are one foot and also let into a groove. The back will occupy about one inch, which will have about one inch between the doors and the front of the drawers.

The drawers marked *f, f, f,* Fig. 1, are 9 inches deep, 14 in. wide and one foot long. $f^1$, pl. Fig. 1, shows one of the lower drawers pulled out. This drawer is for the reception of the bees. Plate Fig. 4 shows one of the drawers inverted and drawn with the back end of the drawer in front, *c* being the back end; *d* the fore end; Fig. I, pl. Fig. 1, *a* the end of the sliding bottom floor on which the bees pass to the boxes marked *c, c,* &c., *d, d,* &c., pl. Fig. 1; 4, pl. Fig. 4, the edge of sliding bottom which slides in a groove cut diagonally from the lower back corner of the side to the upper front corner of the side, which gives an angle of 29½ degrees elevation for the sliding bottom.

1, 2, pl. Fig. 4, represents the bees on their way to the honey boxes.

3, pl. Fig. 4, 3, 3, ft. Fig. 2, and 3, 3, ft. Fig. 1 shows a bee in the act of passing through the opening cut in the shelf directly over the opening in the drawer. Those openings are closed by pieces of tin 10, 10, pl. Fig. 1. A small slit is made in the edge of the 2d shelf 14, directly over the opening ft. in the honey box, pl. Fig. 1.

*i,* pl. Fig. 1, and *k,* pl. Fig. 1, are holes for the bees to communicate with the outer boxes, the hole in the partition being opposite the hole in the side of the box.

*h, h,* pl. Fig. 1, are stops of tin with a hole through of the same size which slides in a groove cut in the side of the partition for the purpose of stopping the communication at pleasure. There are three of these drawers with a sliding bottom.

Pl. Fig. 2 represents the middle box inverted; *a,* the sliding bottom to be taken out for the purpose of putting in the bees or taking out the honey; *b,* the passage for the bees from the lower drawers.

*d, d,* are brass nails driven in to pull the drawers out by.

4, 5 are pieces about ½ inch square into the edge of the slides to make a space for the bees to pass up and down, and also to keep sides of the box steady.

*e* is a piece of glass which may be set in a sash or in a groove cut in the side of the box, the box from out to out is 16 in. high 14 in. wide and one foot long with 2 holes cut in the top 1 inch wide by 2 in. long, shown at C, C, pl. Fig. 1, and also holes cut in the shelf of the same size over the drawers.

*n, n,* show the holes in the shelf. Those openings are to admit the bees to the small boxes above. There are six of the small boxes with open hole in the bottom of each. The bottoms slide in a groove cut in the sides.

Pl. Fig. 3 shows one of the boxes inverted; *a,* the bottom; 4, the hole; 5, a piece let in to support the sides of the box; 6, the glass; 7, 7, brass nails to pull the drawers out by.

$d^1$, pl. Fig. 1, also shows one of the boxes inverted; 4, the square hole one by 2 in. $d^2$, and $d^3$, shows 2 of the boxes shoved to their place. $d^4$ shows a box drawn partly out with a hole 8 in the top to correspond with the holes *c, c,* &c., in the upper shelf marked *m.* 12, 12, show two of the pins taken out. Those holes are for the purpose of blowing in smoke to drive the bees from the small boxes below and also to admit the bees into a bowl or small boxes placed over them at pleasure for use, the shelf *m* being 6 or more or less inches down from the top of the end pieces, which forms a close box when the lid *a,* pl. Fig. 1, is let down.

16, pl. Fig. 1, is a piece 6 or more inches wide nailed on to the front edge of the end piece and forms the front part of the upper box or chamber; 17, a section of the back; *a,* the lid; B, B, the doors hung with hinges; *a,* pl. Fig. 5, shows a section of the back side of the chest; b, the shelf for the bees light on, and where the place is attached to the side of a room this shelf should be placed on the outside of the house and openings made through to let the bees in; a, cleat nailed on the back side of the palace to form a groove for the slide, d, to work up and down in. This slide is for the purpose of closing up the palace at night to keep out insects that might harm the bees. This shelf should from an angle of 29½ degrees to correspond with the sliding bottom, pl. Fig. 4. The bottom is made slide and take out for the purpose of cleaning off any particles of dirt which might collect. Those who do not wish to put on the slide at the back as shown at pl. Fig. 5, will obviate any insects getting in by putting in the drawers bottom side up, which in many cases will be preferable. The whole of the palace may be made of any thin wood which the builder may please to use or the occasion require, which sit in a parlor or drawing room. It may be made of black walnut or mahogany and form a beautiful piece of furniture and at the same time quite a curiosity, as the glass in front of the drawers will give a view of the whole operation of the bees.

What I claim as my invention and desire to secure by Letters Patent is—

The combination of the tin slides g, g, with the small drawers d, d, perforated at the top with holes corresponding to the plug holes c, c, said slides being used in connection with said drawers and plug holes for the purpose of smoking and driving the bees from the boxes to secure honey without injuring the bees using for that purpose any metallic or other substance which will produce the intended effect.

FREDERICK WOLFERSBERGER.

Witnesses:
I. H. MERRILL,
JOHN BARR.